United States Patent [19]

Kim

[11] 4,326,780

[45] Apr. 27, 1982

[54] PORTABLE THERMO-ANEMOMETER WITH BIMETALLIC SENSOR

[76] Inventor: Dae Sik Kim, 1178 Walnut St., Newton, Mass. 02161

[21] Appl. No.: 115,545

[22] Filed: Jan. 25, 1980

[51] Int. Cl.³ .................. G01K 5/00; G08B 17/06
[52] U.S. Cl. ............................. 340/594; 73/357; 73/363.5
[58] Field of Search ............. 73/363.5, 1 F; 340/594, 340/643, 606, 673, 608, 643

[56] References Cited

U.S. PATENT DOCUMENTS

| | | | |
|---|---|---|---|
| 2,549,623 | 4/1951 | Moore, Jr. ........................ | 73/357 |
| 2,821,837 | 2/1958 | McCorkle, Sr. ............... | 73/363.5 X |
| 2,873,329 | 2/1959 | Swenson ...................... | 73/1 F |
| 2,959,958 | 11/1960 | Savet ........................... | 73/349 X |
| 3,123,903 | 3/1964 | Flanagan ...................... | 73/1 F X |
| 3,238,780 | 3/1966 | Doyle ........................... | 73/363.5 |
| 3,570,313 | 3/1971 | Frank et al. .................. | 73/362 AR |
| 3,656,080 | 4/1972 | Wells ........................... | 73/363.5 X |
| 3,745,545 | 7/1973 | Darbo .......................... | 340/594 |
| 3,857,285 | 12/1974 | Athey et al. .................. | 73/362 AR |
| 4,000,647 | 1/1977 | Tauchmann ................... | 73/359 RX |
| 4,136,330 | 1/1979 | Estaque ........................ | 340/594 X |
| 4,220,950 | 9/1980 | Clark et al. ................... | 340/594 |

*Primary Examiner*—Daniel M. Yasich

[57] ABSTRACT

An extremely sensitive portable thermo-anemometer comprises: (1) a matched pair of preformed bimetallic cantilevers which are arranged symmetrically to face and bend toward each other upon a temperature change and which also functions as a vibrating contact switch, current path and heat sink; (2) mechanically combined actions, of a thumbwheel, a lead screw and a rider, which provide an accurate means of controlling, balancing, and indicating the separation of the two tips in opposition to the thermally induced bending force with screw and wedge action; (3) a contact indicating system having a LED lamp and power supply; and (4) a casing which houses the working components and supports their functions. For household heat loss and draft detection, methods for accurate determination of temperature drop based on the sharp transition between near contact and complete contact as a "nulling point" and for measuring cold air velocity based on transient heat transfer process between the sensor and the cold air and the effect of air velocity on the rate of transfer.

6 Claims, 4 Drawing Figures

PORTABLE THERMO-ANEMOMETER WITH BIMETALLIC SENSOR

BACKGROUND OF THE INVENTION

1. Field of the Invention

This invention relates to a method and an apparatus for measuring gas temperature and flow. In more specific aspect, the invention is a portable thermo-anemometer based on bimetallic sensing element.

2. Description of the Prior Art

Heretofore, many devices and systems are employed for measurement of temperature, in general, and measurement of ambient air temperature, in particular. These devices range from a simple household mercury thermometer to a technically sophisticated laboratory instrument, such as a high response two-dimensional thermocouple with a super sensitive D.C. milli-microvoltmeter system which this inventor used in his dissertation work.

Unfortunately, none of the existing devices is suitable for a homeowner in detecting and evaluating various heat losses which are commonly occuring in a residential unit. A low cost portable heat loss and draft detector will help in conserving fuel which is becoming more scarce and expensive.

Recently, infra-red detection devices have been used to map the exterior temperature profile or housing unit for heat loss detection. These devices are generally expensive and require a trained operator. Similar mapping of interior temperature profile is far more desirable in assessing the local heat loss through the walls or windows by conduction and, more importantly, in locating the cold air stream, draft, entering from the outside. Also information on the velocity of the stream is equally important. Infra-red detectors are not suited for this use. A small hand-held thermo-anemometer is a logical solution.

Obviously, a low cost portable thermometer, based on either a thermocouple or a thermistor with a simple circuit and a meter, can be easily constructed by anyone with an elementary knowledge of electronics. However, usefulness of such a device is doubtful because it can provide only limited sensitivity. Expensive components are necessary for detection and measurement of small voltage change in a thermocouple or of current change through a thermistor, which requires a stable power supply in addition.

For a device to be useful for heat loss and draft detection, it must be sensitive to the ambient air temperature drop of a fraction of a degree and, at the same time, responsive to the temperature change in order of a few seconds. Also the sensing element must have well-defined geometry for use as a temperature based anemometer. All commercially available units which meet these requirements are expensive scientific laboratory instruments and are not very handy.

Although bimetallic, or thermostatic, strips, in various forms, are widely used as a temperature sensing element in inexpensive thermometers and temperature control devices, no attempt had been made to use these elements for an extremely sensitive thermo-anemometer. In prior art devices, the temperature dependent deformation of fixed geometry bimetallic strip and the balance between this thermal deformation and the elastic restoring force of the metals were utilized. Additionally, in many control applications, the electro-conductivity of the metals was used as a current path. In time-delay switches, an external heating and heat capacity of bimetal were used. In these prior applications, high sensitivity was not the object.

SUMMARY OF THE INVENTION

The present invention provides means of detecting a very small temperature drop from one location to another, of measuring the temperatures or the temperature difference with high accuracy, and of measuring local velocity of cold air stream.

This invention utilizes a matched pair of bimetallic cantilevers as a temperature sensing element, current path, contact switch, and heat sink. The pair is arranged symmetrically to face and to bend toward each other. A movable partition, rider, is placed between two strips and is moved to control separation of two free ends, tips, of the strips. Extreme proximity or near contact of the tips serves as a "null point" between the thermally induced bending and the mechanically controlled separation in this thermo-mechanical system. The physical contact, or separation, of the tips is indicated by a light emitting diode (LED) lamp which is connected in series with the strips and dry cell. High internal resistance of LED protects the other circuit elements and maintains the heating effect to a negligible level for even very thin strips.

In this invention, for accurate detection of the null point, or the balance between thermal bending and mechanical separation, a tapping induced vibration of the strips and the resulting blinking of the light are used. This unique combination, of fast response of LED and elasticity and the shape of bimetallic strips, provides very sharp demarkation between "almost contact" to complete contact. From a blinking contact, either a very slight increase in thermal bending force by temperature change or a very slight release in the separating force prevents their separate individual vibration and makes the lamp stay lit. Therefore, this sharp change from blinking to lit lamp provides very sensitive means of detecting any minute temperature change. This sensitivity can be easily extended to few hundredths of a degree with longer and thinner strips.

For accurate determination of temperature or temperature difference, this invention utilizes two stages of motion reduction for the mechanical separation of the tips. The first stage is familiar screw, where rotation of thumbwheel produces only slight linear motion of the rider which maintains a fixed distance between two strips. The second stage is, or course, the result of the perpendicular orientation of rider movement to the tip movement in bending.

Unlike a simple mechanical wedge, the motion of rider changes both the active length of cantilevers and the angles of wedge action. These changes make a theoretical analysis of this thermo-mechanical system very complex and the relationship between the position of rider and temperature very non-linear. In practice, however, a slight movement of the tips are expanded into a large travel of rider and even larger rotation of the thumbwheel with a good repeatability. Thus, a proper calibration is the only additional requirement for high accuracy.

Furthermore, the non-linearity provides higher expansion of scale at the higher temperatures when the strips are arranged to detect temperature drop by placing the metal with higher thermal expansion facing inside toward each other. For the household use, this arrangement provides many obvious advantages. Detection of temperature drop from average ambient room temperature and the evaluation of the conduction losses through the walls require high sensitivity near the ambient temperature. Similarly, when the higher expansion metals face outside to detect a temperature rise, the scale is expanded more at the lower temperatures near ambient. This arrangement is very useful in detecting a hidden heat source.

The operating range and sensitivity of the sensing elements can be easily changed by re-forming the strips, simply by bending them beyond their elastic limits. Unfortunately, each re-forming requires a new set of calibration. In household uses, however, relative measure is more important and accurate calibration are not required.

To measure relative velocity of cold air stream, this invention utilizes effect of gas velocity on the rate of heat removal from the sensing strips. In this transient heat transfer process, the time required to reach any given fraction of temperature drop from ambient to the cold air is independent of the two temperatures or the difference between them but depends on the heat transfer coefficient, which is a direct function of the air velocity. In practice, the probe is adjusted to temperature at approximately midway toward the cold air temperature, reheated to the ambient temperature, and then returned to the cold air stream. The time which is required for the lamp to light in the cold air stream, provides a relative measure of the velocity of the air stream. Unlike in a hot wire anemometer, the heat capacity of the sensing strips acts as the transient heat source.

In one embodiment, this invention is incorporated into a self-contained portable probe where two piece casing contains working components which are described hereto. Further objects and advantages of my invention will become apparent from a consideration of the drawings and ensuing description thereof.

DESCRIPTION OF THE PREFERRED EMBODIMENT

Figure 1:
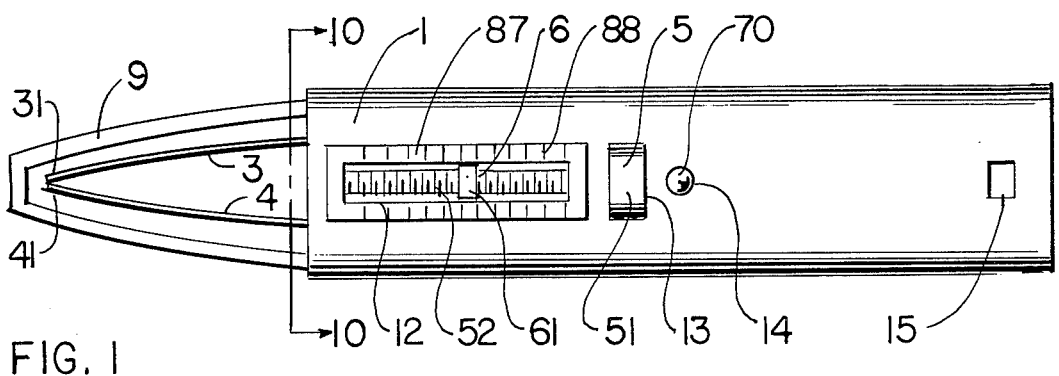
FIG. 1 is a top view of a portable thermoanemometer probe illustrating one embodiment of the present invention.
Figure 2:
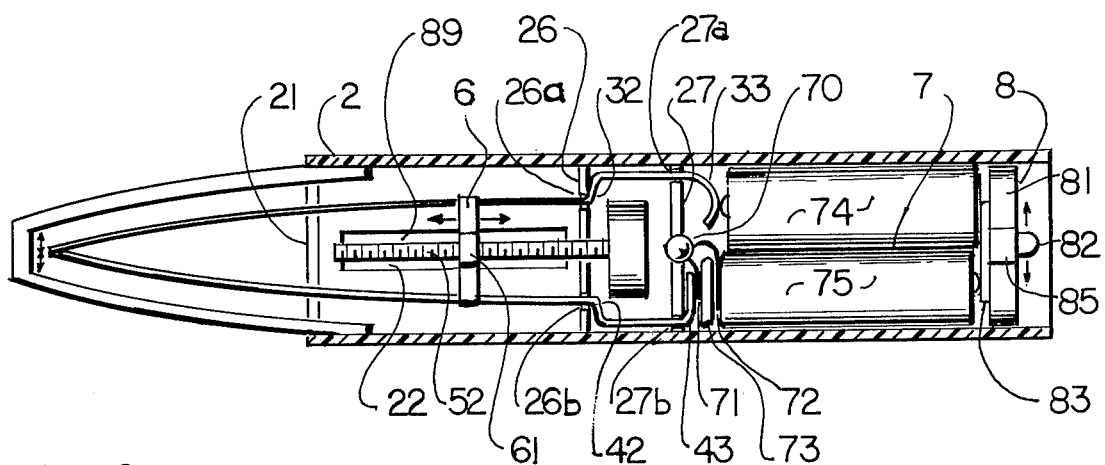
FIG. 2 is an interior view of FIG. 1, where the upper half of casing is removed.

Referring to both FIG. 1 and FIG. 2, in detail, a thermo-anemometer of this invention is shown generally comprised of a two-part casing 1 and 2, which also provide an effective spacedly mounted supporting means for matched pair of preformed bimetallic cantilever strips 3 and 4, thumbwheel screw 5, rider 6, electronic contact indicating system 7, switch/cover plate assembly 8, transparent window 87 with scale markings 88, cover 89, and guard 9.

Upper half 1 is essentially identical to lower half 2, except additional opening 14 of the upper half for LED lamp 70. Also pre-formed bimetallic strips 3 and 4 are identical except the slight difference in bends 33 and 43. Thus, to identify each corresponding or mating parts, common second digits are used in numbering, whenever possible.

Figure 3:
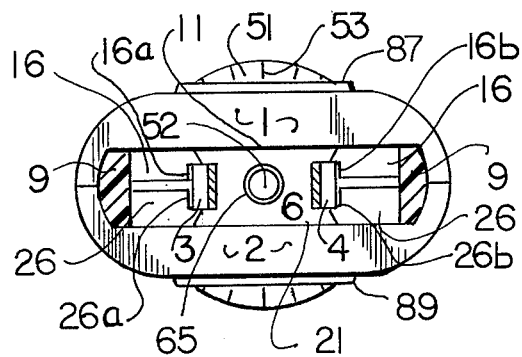
FIG. 3 is an enlarged left side view at the section line 10 in FIG. 1.
Figure 4:
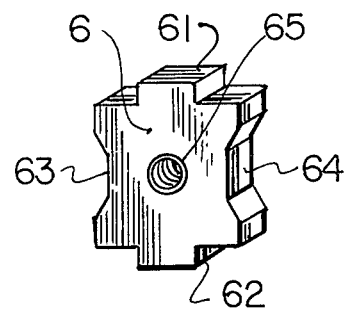
FIG. 4 is a perspective view of the rider.

A rigid casing is formed by joining two halves 1 and 2, securely. The casing houses components, supports their functions and can be held comfortably in a hand for use. Recesses 11 and 21 of both halves form an opening for strips 3 and 4 and guard 9 as shown in FIG. 3. Both ends of U shaped guard are joined securely to the interior wall of casing. Rectangular openings 12 and 22 act as guideways to keys 61 and 62, respectively, of movable means or a rider 6 and allow only linear motion of rider 6, as shown by the arrows. Rider 6 maintains a constant separation between 3 and 4 at the points of contact with the recessed bearing surfaces 63 and 64 in FIG. 4, respectively. The recesses, with help of retaining grooves 26a and 26b on rib 26 and 27a and 27b on rib 27 together with four corresponding grooves on the upper half keep both strips 3 and 4 in a single plane and ensure a proper contact of tips or free ends 31 and (32) 41. These four pairs of retaining grooves with the help of four bends 32, 33, 42, and 43 hold the fixed ends of strips 3 and 4 securely and provide an effective spacedly mounted means. Opening 12 is covered by transparent window 87, so that upper key 61 can indicate the position of rider which provides means of indicating the extent of mechanical separation to balance against thermally induced bending. Calibration markings 88 are printed directly on the window. Cover 89 for opening 22 needs not to be transparent.

Opening 13, with corresponding one on the lower half, positions and partly exposes thumbwheel 51 for turning, accurately. A minimal clearance between the openings and wheel 51 is most desirable. The location of rider is more accurately indicated by angular markings 53. Lead screw 52 passes through and engages tapped hole 65 and is securely attached to wheel 51. Internal ribs 26 and 27 have the retaining grooves and give additional structural strength. Four pairs of grooves hold the strips in position and they are positioned to assure minimal heat conduction to the strips from the casing which is held in hand during use and maximum resistance to twisting in vibration. Sharp bend 32 defines the length of cantilever, assures firm contact between strip 3 and recessed face 63, and provides room for thumbwheel 51. The bend 33 provides an elastic force to push cell 74 against metal slide 83 to ensure the electric contact. Similarly, bend 43 push lead 71, insulation pad 73, the other lead 72, cell 75, and metal slide together. The LED lamp 70 which provides a visual means of indicating contact of the free ends must be compatible with a 3.0 volt supplied by two AA cells in series and the placement of the cells must be in the current direction of the diode. "Many LEDs, which are commonly used for panel indicator lamps, are compatible."

Switch/cover plate assembly 8 contains metal slide 83 which is attached to sliding knob 82 through a hole on cover plate 81. A pair of tongues, only 85 is shown, mates with a pair of openings on the casing, only 15 is shown, and plate 81 is secured in place. The plate can be removed by forcing two halves of the casing apart and disengagig the tongues. Because of the low current, about 20 mA, and only intermittent current flow, the cells last for long time. Accurate dimensions of each part can be easily obtained from that of AA cell 74 or 75 in FIG. 2.

Among the various commercially available bimetallic strips tested, the sample (721–675, size 9×150 mil) supplied by Polymetallurgical Corporation of Attleboro Falls, Massachusetts, performed best for household heat loss and draft detection. For this application, the metal with higher thermal expansion should face inside and the strips should be pre-formed to operate between 70 and 60 degree F. This will result in average four turns per degree of accuracy and sensitivity of one fortieth of a degree with a #6-32 lead screw.

An injection molded ABS was used for casing parts 1 and 2, thumbwheel 51, rider 6, cover plate 81, sliding knob 82, and guard 9. Different colors were selected for the moving parts, 51 and 6. Casing parts 1 and 2 and guard 9 are solvent bonded. Pressure sensitive films were used for covers 87 and 89.

For temperature calibration, air stream at a known temperature is required. Four different temperatures are preferred for the non-linear intrapolation. Similarly, for velocity calibration, a cold air with known temperature and velocity is required. To take a reading in a still air, one should equilibrate the strips by shaking the probe few times. The directin of air flow should be perpendicular to the plane of the strips. The probe should be tapped gently in the direction of the plane as the thumbwheel is adjusted to blinking.

In the simplest household usage, the probe can be adjusted to room temperature at the center of a room. Using this setting as the reference, two dimensional air temperature profile close to walls and windows can be easily obtained in terms of turns of thumbwheel rather than in degrees. This probe will identify areas where heat loss is great and where cold air is entering. Further, the relative amount of cold air entering into the room can be evaluated by the method already described in the previous section. This simple device will help an average homeowner to plan most cost effective reduction of heat losses.

While the above description contains many specificities, these should not be construed as limitations on the scope of the invention, but rather as an exemplification of one preferred embodiment thereof. Many other variations are possible, for example, an audible signal can be used for the indication of the tip contact, a tapered strip could be used to increase sensitivity without loss of mechanical strength, a single cantilever sensor with fixed metal contact could be used, or two parallel strips with a rigid central conductor could be used for a dual temperature drop/rise detector. Accordingly, the scope of the invention should be determined not by the embodiment illustrated, but by the appended claims and their legal equivalents.

What is claimed is:

1. A hand held probe for detecting ambient air temperature changes comprising:
   a. plurality of cantilever bimetallic temperature sensing strips having fixed ends spacedly mounted by means in one end of said probe, said sensing strips extending outwardly from said one end of said probe with free ends of said sensing strips arranged to contact at a substantially (fixed) remote location by thermally induced bending toward each other;
   b. movable means operatively cooperating with said spacedly mounted means and said sensing strips for controllably separating said free ends from each other by partially nullifying said thermally induced bending by selective movement of movable means to separate said free ends;
   c. means co-acting with said movable means to selectively move said free ends, wherein indicia on said support will indicate the extent of said separation required to balance against said bending;
   d. means connected to said sensing strips to visually indicate when said free ends come into contact with each other.

2. The probe of claim 1 wherein said means of separation comprises:
   a. said movable means includes a rider placed between said pair of strips, having a pair of recessed bearing surfaces which maintain a constant separation between said strips and substantially nullify the effect of said thermally induced bending of the portion of said strips between said fixed ends and said rider;
   b. means on said probe confining the movement of said rider to a linear motion along the center line of said strips; and
   c. means for selectively positioning said rider at position between said fixed ends and midway to said free ends.

3. The probe of claim 2 wherein said means of confining consists of a pair of keys on said rider and mating pair of rectangular guideways on said casing.

4. The probe of claim 2 wherein said means of positioning is a combination of a tapped hole in the center of said rider and a lead screw which is located through said center and engages and passes through said tapped hole and also is securely connected to a thumbwheel which is restrained to a pure rotational motion by a pair of openings in said casing.

5. The probe of claim 4 wherein said means of indicating the extent of the separation includes linear displacement of said rider and displacement of said thumbwheel.

6. The probe of claim 1 wherein said means of indicating includes a series circuit and comprises a dry cell power supply; a light emitting diode; said bimetallic strips which act as conductor and a contact switch; a shut-off switch and connectors.

* * * * *